United States Patent [19]
Dupointe

[11] Patent Number: 6,125,797
[45] Date of Patent: Oct. 3, 2000

[54] ALTERNATE FUEL SYSTEM FOR AN ENGINE

[76] Inventor: Francis M. Dupointe, 19 Highview Blvd., Brookhaven, N.Y. 11719

[21] Appl. No.: 09/211,224

[22] Filed: Dec. 14, 1998

Related U.S. Application Data

[63] Continuation-in-part of application No. 08/794,632, Feb. 3, 1997, abandoned.

[51] Int. Cl.$^7$ .................................................. F02M 21/02
[52] U.S. Cl. .................................... 123/27 GE; 123/526
[58] Field of Search .................................. 123/525, 526, 123/527, 27 GE, 575, 557, 529, 576, 578

[56] References Cited

U.S. PATENT DOCUMENTS

| | | | |
|---|---|---|---|
| 3,646,924 | 3/1972 | Newkirk et al. | 123/578 |
| 4,372,278 | 2/1983 | Smith | 123/557 |
| 4,421,087 | 12/1983 | Schuurman | 123/525 |
| 4,513,727 | 4/1985 | Lagano et al. | 123/27 GE |
| 4,606,319 | 8/1986 | Silva | 123/527 |
| 4,645,450 | 2/1987 | West | 431/12 |
| 4,967,712 | 11/1990 | Chasteen | 123/478 |
| 5,010,868 | 4/1991 | Clements | 123/527 |
| 5,085,193 | 2/1992 | Morikawa | 123/458 |
| 5,092,305 | 3/1992 | King | 123/27 GE |
| 5,150,690 | 9/1992 | Carter et al. | 123/527 |
| 5,499,615 | 3/1996 | Lawrence et al. | 123/526 |
| 5,540,208 | 7/1996 | Kikutani | 123/518 |
| 5,546,911 | 8/1996 | Iwamoto et al. | 123/497 |
| 5,632,250 | 5/1997 | Kato et al. | 123/490 |
| 5,832,905 | 11/1998 | King et al. | 123/575 |

*Primary Examiner*—Willis R. Wolfe
*Assistant Examiner*—Hyder Ali
*Attorney, Agent, or Firm*—Collard & Roe, P.C.

[57] ABSTRACT

The invention relates to an alternate fuel system for a diesel engine that contains a fuel processing unit, and a alternate fuel storage tank that feeds alternate fuel to the fuel processing unit and then on to the engine. In this case, there are a series of pressure control valves that control the pressure and flow of the alternate fuel from the storage vessel to the fuel processing unit. In addition, to ensure safe operation of the fuel processing unit it has a relief valve that releases excess pressure from the system. Furthermore, this fuel processing unit has a heater to vaporize the alternate fuel for feedings into the system. This alternate fuel system will feed the alternate fuel from the fuel lines in either a fixed fuel flow or a variable fuel flow system.

9 Claims, 3 Drawing Sheets
ALTERNATE FUEL SYSTEM FOR AN ENGINE

This application is a continuation-in-part of U.S. application Ser. No. 08/794,632 filed on Feb. 3, 1997, now abandoned.

BACKGROUND OF THE INVENTION

1. Field of the Invention

The invention relates to a dual fuel system for integrating a diesel fuel system with an additional fuel.

2. Description of the Prior Art

Dual fuel systems are known in the prior art. For example, U.S. Pat. No. 5,499,615 to Lawrence et al. discloses a direct injection propane fuel system for diesel engine applications. Essentially the invention is a liquid propane injection system that includes a liquid propane fuel tank, a pump, a heat exchanger, a reservoir, and an injector.

U.S. Pat. No. 5,540,208 to Kikutani discloses a liquified gas fuel supply system that is designed to vaporize liquified gas fuel supplied from a fuel tank.

U.S. Pat. No. 5,085,193 to Morikawa discloses a solenoid operated valve that controls the pressure of fuel supplied to a fuel injector. The fuel pressure is determined in accordance with engine operating conditions.

U.S. Pat. No. 4,967,712 to Chasteen discloses a fuel injection system for a two-stroke cycle engine that is designed for extreme weather conditions. This engine contains an air manifold, a throttle valve, a fuel injector, a fuel supply system including a fuel pump, a battery voltage sensor, an air temperature sensor, an engine speed sensor, a timing sensor, a barometric pressure sensor, and a throttle position sensor. In addition, the device includes a first data processor for receiving and sending signals for determining fuel injector duration, timing, and a fuel pump operating speed.

U.S. Pat. No. 5,010,868 to Elements discloses a gas phase fuel delivery system that is provided for delivering a vapor phase fuel to a regulator independent of fuel tank temperatures.

U.S. Pat. No. 4,645,450 to West discloses a flow control system for optimally controlling the flow of air and fuel to a burner in a plurality of operating modes throughout the firing range that the burner is in.

U.S. Pat. No. 5,150,690 to Carter et al. discloses a flow control system for use in a compressible fluid fueled internal combustion engine that includes a fluid metering device comprising a plurality of fluid lines for communication between an inlet fluid manifold and a metered fluid manifold.

U.S. Pat. No. 5,632,250 to Kato et al. discloses a gas fuel supply system for a vehicle wherein fuel pressure is sensed by a pressure sensor provided upstream of a regulator that is a predetermined value or less to avoid abnormal combustion caused by the improper alignment of the air/fuel ratio.

U.S. Pat. No. 5,411,058 to Welsh et al. discloses a system for storing, handling, and controlling the delivery of gaseous fuel to internal combustion engines. This device is powered to run simultaneously on both liquid fuel and gaseous fuel. The invention provides a control system having a float controlled solenoid for ensuring that a consistent supply of dry gas is delivered to the engine.

U.S. Pat. No. 4,373,493 to Welsh discloses a method and apparatus for utilizing both a liquid fuel and a gaseous fuel with minimum change in a standard internal combustion engine. The gaseous and liquid fuels are fed from separate fuel supplies with the flow of fuels being controlled in response to engine load so that only gaseous fuel is supplied and combusted by the engine.

U.S. Pat. No. 5,546,911 to Iwamoto et al. discloses an improved fuel injection control apparatus in which a reference pressure is provided to a pressure regulator. The device simplifies for the fuel supply system by preventing the fuel quantity injected from injection valves into an engine from being influenced by variations in the air intake pressure.

The present invention is unlike the prior art because it has a fuel intake location that both before and after a turbo-charger on an engine. In this way, the fuel mixture is aerated both before and after the fuel is injected.

SUMMARY OF THE INVENTION

The invention relates to a dual fuel supply system that includes a fuel injection system that links to a fuel line both before and after a turbo-charger. Essentially, the basis of the fuel supply system is to operate simultaneously with the base fuel system of the vehicle. As the alternate fuel system administers the alternate fuel to the motor, the electronic on board fuel system corrects the amount of base fuel, (diesel) being offered to the diesel motor. In addition, the system uses external sensors mounted on the water jacket for temperature "Hold Back" of the alternate fuel during cold start or open loop conditions of the OEM fuel management system.

The alternate fuel is stored in a specially designed vessel on board the vehicle. This vessel offers the delivery system a dry vaporous fuel for delivery. The delivery pressure to the delivery line is controlled via a first stage pressure control regulator. The fuel processing unit delivers fuel to the engine under two conditions. First, there must be adequate pressure to deliver this fuel; second, the engine must be running, with the temperature of the engine being sufficiently high to burn this additive fuel. There is also a temperature switch that is triggered when the temperature of the engine reaches a sufficient heat. This temperature switch passes a control current to the fuel processor via a control wire. This alternate fuel system has worked best when the alternate fuel via the alternate fuel processor is divided into two separate service functions. The first service function is a fixed flow, and the second is a variable flow of the fuel.

The fixed flow of the alternate fuel system is offered downstream of the turbo charger and upstream of the diesel motor in it's intake manifold. Providing alternate fuel at this location satisfies the needs for near complete combustion during cruising revolutions per minute or idle conditions of the diesel motor. The amount of alternate fuel remains constant at these conditions until the turbo charger is activated by the power requirements of the driver. At this point, the intake manifold becomes positively pressurized in excess of the operating service pressure of the fixed flow service line, and the fixed alternate fuel orifice. Thus, the flow of alternate fuel is interrupted. This interruption alters the ratio of alternate and diesel fuel and the near complete combustion is lost. This is evident by the black smoke emanating from the exhaust stack of the vehicle.

In the variable flow system, the alternate fuel is provided upstream of the turbo charger, in the turbo intake manifold. The distribution of the alternate fuel in this location satisfies the need for a near complete combustion during activation and operation of the turbo charger. Since the turbo charger creates a very negative variable pressure on the turbo intake manifold, the amount of combustion air and diesel fuel being consumed by the engine is increased. Thus the rate of flow of alternative fuel required to maintain near complete combustion of the diesel fuel must be increased proportionately.

This variable flow of alternate fuel from the fuel processor responds to these conditions and pressure from the turbo intake manifold. This is accomplished via a pressure activated switch which in turn, passes electrical power to the fuel processing unit via an electrical control wire. This process attempts to maintain the ratio of alternate fuel to the base fuel. This is successfully accomplished by eliminating black smoke from the exhaust stack of the vehicle during the time that the turbo charger is operating.

In the second embodiment of the invention, the alternate fuel system is a turbo charged system that is fuel controlled via a mechanical fuel system. The basis of operation for this system is to operate simultaneously within the base fuel system of the vehicle. In both the mechanical diesel fuel system, and the electric alternate diesel fuel system, flows are adjusted and tuned to synchronize the operations at maximum efficiency.

An object of the invention is to provide an alternate fuel processing system that reduces the amount of excess exhaust emitted from an engine.

Another object of the invention is to provide an alternate fuel processing system that provides two different types of fuel to a system to better control the acceleration of a motor vehicle.

BRIEF DESCRIPTION OF THE DRAWINGS

Other objects and features of the present invention will become apparent from the following detailed description considered in connection with the accompanying drawings which discloses one embodiment of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF THE PREFERRED EMBODIMENT

Figure 1:
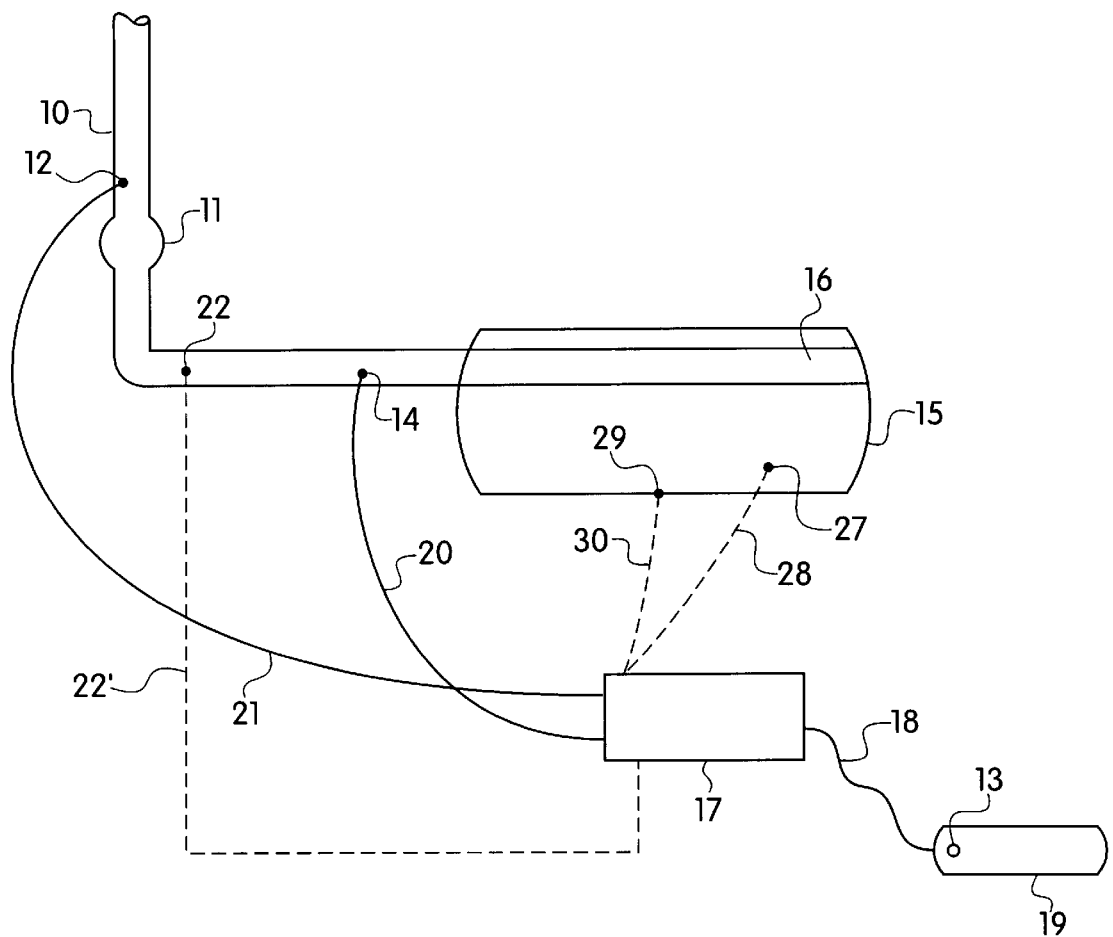
FIG. 1 is a schematic representation of the dual fuel system.

Referring to FIG. 1 there is shown a block diagram of the alternate fuel system in a turbo charged diesel system that is fuel controlled via an electronic or computerized fuel system. This fuel system operates simultaneously with the base fuel system of the vehicle. As the alternate fuel system administers alternate fuel to the motor, the electronic on board fuel system corrects the amount of base diesel fuel being provided to the motor.

The alternate fuel is stored in a specially designed vessel 19. Vessel 19 offers the delivery system a dry vaporous fuel for delivery. The delivery pressure to the delivery line is controlled via a first stage pressure control regulator 13. The pressure at which the fuel is controlled is kept within a pressure range so as to keep the vapor alternative fuel in its usable state at temperatures as low as −20 degrees Fahrenheit. In addition, alternate fuel vessel 19 and pressure control regulator 13 must have the proper pressure to deliver alternate fuel to the alternate fuel processing unit 17 while the motor is running. Delivery line 18 is approved for the pressure service and the use on board the motor vehicle. It is routed in a safe and protected manner to prevent chafing and road debris damage and connects vessel 19 to fuel processing unit 17.

Fuel processing unit 17 supplies the alternative fuel to the diesel engine. To activate this vapor fuel transfer, oil pressure switch 27 when pressurized from operating engine 15, passes a control voltage to the fuel processing unit 17 via control wire 28. This occurs when the motor operating temperature is the satisfactory temperature to accept and burn the alternate fuel. At this point the fuel processing unit assures the delivery of the vaporous fuel to the diesel engine through a series of pressure switches, temperature senses and an active control heating system. The service fuel administration to the diesel motor 15 is performed by the fuel processing unit 17 via alternate fuel lines 20 and 21 and alternate fuel orifices 14 and 12.

The alternate fuel system has proven to perform best when the continued administration of the alternate fuel via the alternate fuel processor 17 to the diesel motor 15 is divided into two separate service functions. These service functions are the fixed flow and variable flow service functions.

Under the fixed flow system, the alternate fuel is provided down stream of the turbo charger 11 and upstream of the diesel motor 15, in the engine intake manifold 16. The administration of the alternate fuel in this location satisfies the needs for near complete combustion during cruising revolutions per minute or idle conditions of diesel motor 15. The amount of alternate fuel is very constant at these conditions until the turbo charger is activated by the power requirements of the driver. At this point the intake manifold becomes positively pressured in excess of the operating service pressure of the fixed flow service line 20 and the fixed alternate service fuel orifice 14. Thus, the flow of alternate fuel is interrupted. This interruption alters the ratio of alternate and diesel fuel and the near complete combustion is lost. This is evident by the black smoke (diesel particles) being seen from the exhaust stack of the vehicle.

In the variable flow system, the alternate fuel is offered upstream of turbo charger 11 in the turbo intake manifold 10. By sending alternate fuel into this system, this allows for near complete combustion during activation and operation of the turbo charger 11. Since turbo charger 11 creates a very negative variable pressure on the turbo intake manifold 10, the amount of combustion air and diesel fuel being consumed by the diesel motor 15 is increased. Thus, the amount of flow of alternative fuel required to maintain near complete combustion of the diesel fuel must also be increased proportionately. This variable flow of alternate fuel from fuel processor 17 responds to these conditions and pressures from the turbo intake manifold 10. This is accomplished via a pressure activating switch 22 which in turn passes electrical control power to the fuel processing unit 17 via the electrical control wire'. This process attempts to maintain the ratio of alternate fuel to the base diesel fuel in motor 15. If this ratio is maintained then there is a noticeable lack of black smoke (diesel particles) being witnessed from the exhaust stack of the vehicle during the operating time of the turbo charger.

Figure 2:
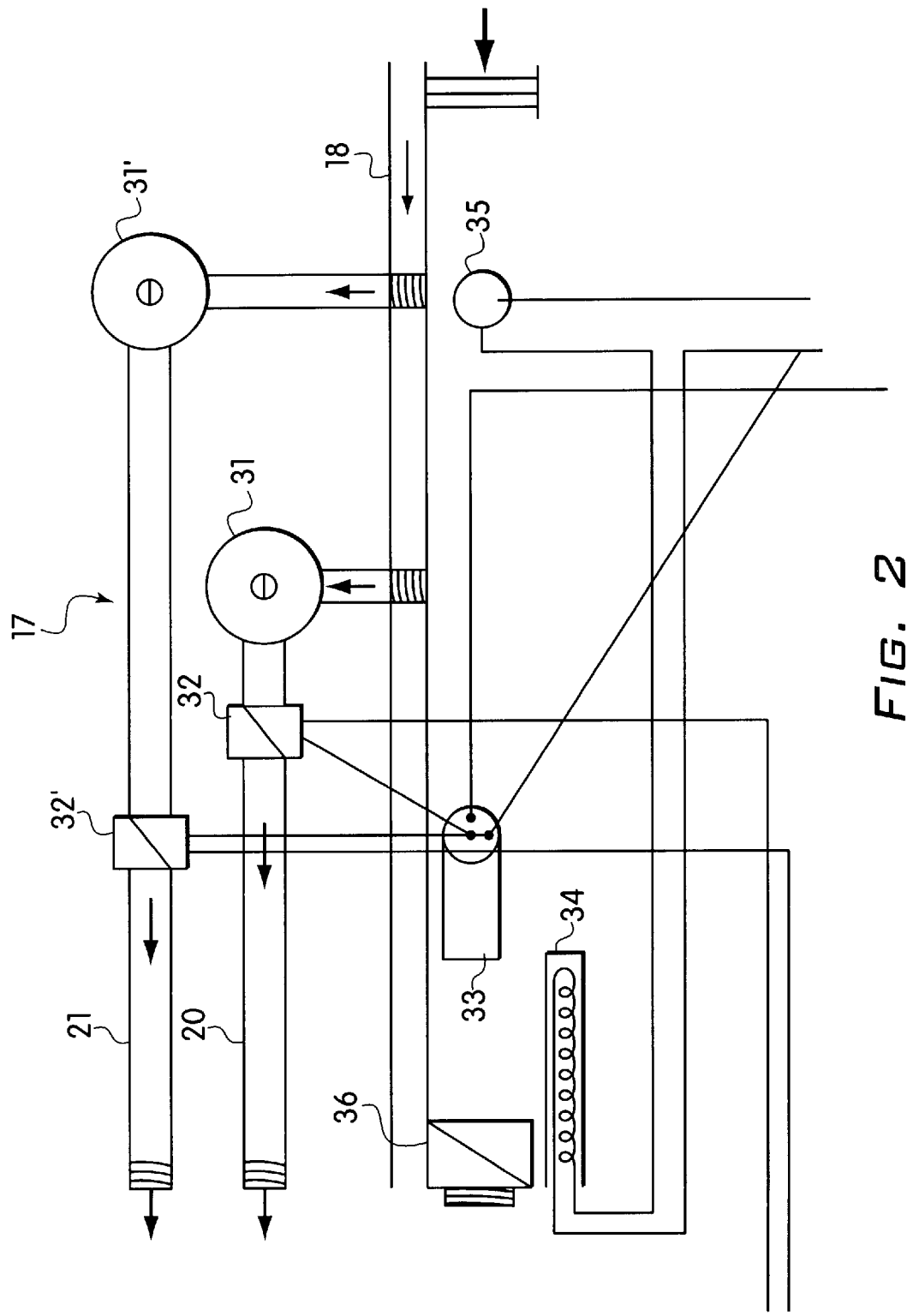
FIG. 2 is a block diagram of the fuel processing unit of the present invention.

Referring now to FIG. 2, the fuel processor unit 17 is shown in detail. Fuel processing unit 17 serves alternative fuel to the delivery hoses 20 and 21 only when the following criteria are satisfied: a) the engine is running at least at idle speed; b) the engine temperature is at least 120 degrees F; and c) the service pressure from the delivery hoses 20 and 21 is at least 4 pounds per square inch. The fuel processing unit 17 also treats any saturated vapor fuel via a heating system 34 that dries the alternative fuel assuring a constant flow of BTU's introduced into the air intake manifold 16 of the engine. Delivery hoses 20 and 21 connect the FPU 17 and the intake manifold 16 by means of secondary alternate fuel orifice injectors 12 and 14. It is these orifice injectors 12 and 14, when drilled to the proper size opening that ensures the proper amount of flow of the secondary alternate fuel to the intake manifold 16. This apparatus forces the primary fuel injection system to adjust the amount of primary fuel that is being pumped into the fuel system.

The timing, flow amount, processing, vaporizing and delivery pressure of the secondary alternate fuel is performed in fuel processing unit 17. The secondary fuel is first introduced into the fuel processing unit 17 by secondary redundant pressure control regulators 31 and 31'. Pressure control regulators 31 and 31' function to ensure that there is little variation in the precessing pressure and flow of the secondary fuel to the engine. In this case, only dry gaseous alternate fuel is released to solenoid valves 32 and 32'. Secondary fuel is then fed to the engine for combustion. If the fuel is saturated with liquid caused by a splash from within the storage vessel, or other atmospheric conditions, the saturated, wet heavier fuel is dropped into a holding area below the main conduit to be vaporized at warmer temperatures.

Fuel processing unit 17 includes a heater 34 used for vaporizing the heavier, saturated secondary fuel so as to meet its BTU requirements, without causing any loss of fuel to be processed. Heater 34 is thermostatically controlled by a laboratory grade bi-metal thermostat 35. The timing of this processing is fed to the engine for combustion, and is controlled by a bimetallic switch 29 (see FIG. 1) connected to the exterior of the motor. Switch 29 activates at between 120 to 140 degrees Fahrenheit.

Alternative fuel flow is permitted only when the pressure of the alternative fuel processed within the fuel processing unit 17 is at least 4 pounds per square inch. This assures that the engine will always have the correct amount of flow of the alternative fuel. This process allows the engine to program its on board computerized electronic fuel system to utilize the fuels at two known levels of alternative fuel flow, thus assuring more reliable results than with current technology. The fuel processing unit 17 in conjunction with activator switch 29 holds back the flow of the secondary alternate fuel until the engine temperature has begun to reach its optimal combustion performance and operating temperature.

For example, the introduction of the alternative fuel at the early stage of engine "warm up" can result in unacceptable levels of unburned hydrocarbons in the exhaust gasses from the engine. The hold back loop of the present invention incorporates the use of an external bi-metal thermostatic activator switch 29 that is mounted to the water jacket of the engine. When the engine temperature reaches approximately 120–140 degrees F, the fuel processing unit 17 is then activated and begins to provide alternative fuel to the engine. The invention includes a control switch to allow secondary activation of the fuel processing unit to administer an additional, separate service loop that provides the increased and variable flow of alternate fuel to the intake manifold 16. This is activated via electric current being passed by turbo charger pressure switch 22 (FIG. 1) that is installed upstream of the solenoid valves 32'. An oil pressure switch 27 a sensor that utilizes oil pressure to conduct power to the solenoid valves 32 for alternate fuel control to the motor. Pressure switch 27 ensures that no alternative fuel is passed to the engine during stall conditions, or during start up cranking conditions when the engine temperature is at least 120 degrees and the operating pressure of the fuel processing unit 17 is above four pounds per square inch.

Pressure switch 27 controls the electronic current, which in turn, activates solenoid valve 32. Solenoid valve 32 controls the gas flow to delivery hose 20. Pressure switch 33 assures proper operating pressure of the fuel processing unit 17 of at least 4 pounds per square inch before allowing electric current to be issued to solenoid valves 32 and 32'. To ensure safe operation, the fuel processing unit 17 is protected against excess pressure via a hydrostatic relief valve 36. Valve 36 relieves excess pressure via self-reset pop-it spring design. This valve protects fuel processing unit 17 against explosion caused from excess heat possibly caused by fire in the engine compartment of the vehicle.

Figure 3:
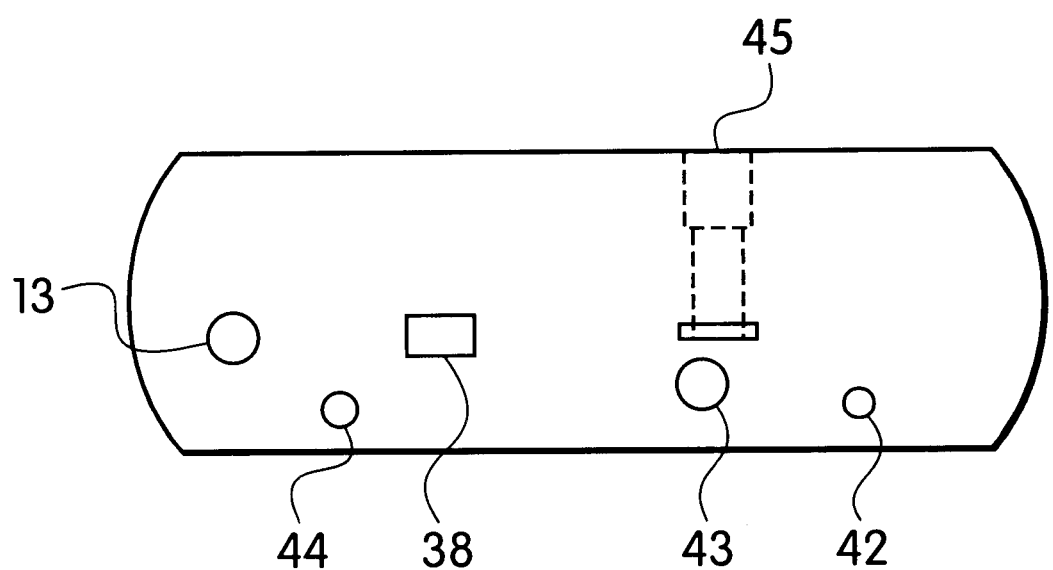
FIG. 3 is a propane storage vessel or tank for use in the alternative fuel system.

In FIG. 3, the secondary fuel is carried on board the vehicle in an American Society of Mechanical Engineers certified storage vessel 19. Vessel 19 should be compact, be capable of carrying sufficient fuel for approximately 12 hours of operation in the largest vehicles and ensure that the alternative fuel introduced to the system is free of saturated vapor and liquid. The vessel preferably incorporates and utilizes the following components: an automatic stop fill 38, a fuel level gauge 44, and a relief valve 42. In addition, there is also a splash guard covering 45 to protect liquid from splashing into the vapor service during sudden automotive movements such as panic stops.

The tank vessel should also be filled via an automatic stop fill 38. The vapor service valve 43 in conjunction with a first regulator 13 ensures that the product remains at a constant pressure and consistency during its use in the system.

Accordingly, while only one embodiment of the present invention have been shown and described, it is to be understood that many changes and modifications may be made thereunto without departing from the spirit and scope of the invention as defined in the appended claims.

What is claimed is:

1. An alternate fuel system for feeding an alternate fuel into a turbo charger and a diesel engine, the system comprising:

at least one alternate fuel vessel for storing the alternate fuel;

at least one fuel processing unit connected to said alternate fuel vessel;

at least one fuel intake line connecting said alternate fuel vessel to said fuel processing unit;

a plurality of fuel intake lines connecting said fuel processing unit to said engine;

a first pressure control regulator located on said alternate fuel vessel for controlling the flow pressure of alternate fuel from said vessel to said fuel processing unit;

at least one secondary pressure control regulator located on said fuel processing unit to control the flow pressure of the alternate fuel from said fuel processing unit to the engine;

at least one valve located on said plurality of fuel intake lines to control the flow of alternate fuel from the fuel processing unit to the engine; and an adjustable pressure switch located on said engine wherein when a oil pressure rises above a predetermined level, it triggers the pressure switch to signal said valve to release alternate fuel into said fuel intake line wherein, the diesel engine receives both said alternate fuel and a base fuel that are of different chemical compositions.

2. The alternate fuel system as claimed in claim 1, wherein said first pressure control regulator insures that the pressure of the alternate fuel flow is at least 4 pounds per square inch.

3. The fuel system as claimed in claim 1, further comprising a thermostat activator switch disposed on said engine so that when the engine heats up to a predetermined temperature, said at least one valve releases the alternate fuel into the system.

4. The fuel system as claimed in claim 1, further comprising a heater disposed in said fuel processing unit said heater for heating the alternate fuel so that it is first vaporized and then fed into the system.

5. The alternate fuel system as claimed in claim 1, wherein the alternate fuel is propane.

6. An alternate fuel system for feeding alternate fuel and primary fuel of different chemical properties of said alternate fuel into a turbo charger and an engine, the system comprising:

at least one primary fuel vessel for storing the primary fuel;

at least one alternate fuel vessel for storing the alternate fuel;

at least one fuel processing unit connected to said alternate fuel vessel;

at least one fuel intake line connecting said alternate fuel vessel to said fuel processing unit;

a plurality of fuel intake lines comprising a first intake line feeding into a turbo intake manifold upstream of said turbo charger and a second intake line feeding into an engine intake manifold downstream of said turbo charge but upstream of said engine connecting said fuel processing unit to said engine;

a first pressure control regulator located on said alternate fuel vessel for controlling the flow pressure of alternate fuel from said vessel to said fuel processing unit;

at least one secondary pressure control regulator located on said fuel processing unit to control the flow pressure of the alternate fuel from said fuel processing unit to the engine;

at least one valve located on said plurality of fuel intake lines to control the flow of alternate fuel from the fuel processing unit to the engine; and an adjustable pressure switch located on said engine wherein when a oil pressure rises above a predetermined level, it triggers the pressure switch to signal said valve to release alternate fuel into said fuel intake line wherein, the diesel engine receives both said alternate fuel and a base fuel that are of different chemical compositions.

7. The fuel processing system as claimed in claim 6, wherein said at least one valve is located on said first intake line and said system further comprises at least a second valve located on said second intake line, said valves being used for controlling the flow of fuel into the engine.

8. The fuel processing system as claimed in claim 6, further comprising a pressure activated switch located on the engine intake manifold downstream of the turbo-charger, wherein when the turbo-charger activates, it increases pressure to said intake manifold, triggering said pressure activating switch to signal said fuel processing unit to release alternate fuel into the turbo-charger.

9. An alternate fuel system for feeding an alternate fuel into a turbo charger and a diesel engine, the system comprising:

at least one primary fuel vessel for storing the primary fuel;

at least one alternate fuel vessel for storing the alternate fuel;

at least one fuel processing unit connected to said alternate fuel vessel;

at least one fuel intake line connecting said alternate fuel vessel to said fuel processing unit;

a release valve disposed on said fuel processing unit to relieve excess pressure from the alternate fuel;

a plurality of fuel intake lines connecting said fuel processing unit to said engine;

a first pressure control regulator located on said alternate fuel vessel for controlling the flow pressure of alternate fuel from said vessel to said fuel processing unit;

at least one secondary pressure control regulator located on said fuel processing unit to control the flow pressure of the alternate fuel from said fuel processing unit to the engine;

at least one valve located on said plurality of fuel intake lines to control the flow of alternate fuel from the fuel processing unit to the engine; and an adjustable pressure switch located on said engine wherein when a oil pressure rises above a predetermined level, it triggers the pressure switch to signal said valve to release alternate fuel into said fuel intake line wherein, the diesel engine receives both said alternate fuel and a base fuel that are of different chemical compositions.

* * * * *